United States Patent
Handa et al.

(10) Patent No.: US 7,290,838 B2
(45) Date of Patent: Nov. 6, 2007

(54) VEHICLE WHEEL

(75) Inventors: Akio Handa, Wako (JP); Atsuko Yamaguchi, Wako (JP); Yuji Maki, Wako (JP); Takashi Nishizaka, Ikeda (JP); Shoji Suzuki, Ikeda (JP); Kiyoshi Amaki, Ikeda (JP); Toshio Nishimoto, Kaga (JP)

(73) Assignees: Honda Giken Kogyo Kabushiki Kaisha, Tokyo (JP); Zeniya Aluminum Engineering, Limited, Osaka (JP); Daido Kogyo Co., Ltd., Ishikawa (JP)

( * ) Notice: Subject to any disclaimer, the term of this patent is extended or adjusted under 35 U.S.C. 154(b) by 137 days.

(21) Appl. No.: 10/506,093

(22) PCT Filed: Mar. 20, 2003

(86) PCT No.: PCT/JP03/03416

§ 371 (c)(1),
(2), (4) Date: Mar. 7, 2005

(87) PCT Pub. No.: WO03/080368

PCT Pub. Date: Oct. 2, 2003

(65) Prior Publication Data

US 2005/0168054 A1 Aug. 4, 2005

(30) Foreign Application Priority Data

Mar. 22, 2002 (JP) ............................. 2002-081702
Oct. 10, 2002 (JP) ............................. 2002-298006

(51) Int. Cl.
*B60B 3/14* (2006.01)

(52) U.S. Cl. ............................. 301/63.103; 301/95.11; 301/35.621; 29/894.322

(58) Field of Classification Search ........... 301/35.621, 301/35.623, 35.625, 63.101, 63.103, 63.104, 301/95.101, 95.11, 64.202, 64.305; 29/894.321, 29/894.322
See application file for complete search history.

(56) References Cited

U.S. PATENT DOCUMENTS

| | | | | | |
|---|---|---|---|---|---|
| 1,749,917 | A | * | 3/1930 | Meadowcroft | 219/93 |
| 1,977,567 | A | * | 10/1934 | Eksergian | 219/93 |
| 2,551,783 | A | * | 5/1951 | Ash | 301/63.104 |
| 2,948,055 | A | * | 8/1960 | Baxter et al. | 29/894.31 |
| 3,784,260 | A | * | 1/1974 | Araya | 301/95.105 |
| 4,286,825 | A | * | 9/1981 | Sieving | 301/95.105 |
| 4,639,044 | A | * | 1/1987 | Enders et al. | 301/35.625 |
| 5,613,739 | A | * | 3/1997 | Sands | 301/95.11 |
| 6,029,351 | A | * | 2/2000 | Cvijanovic | 29/894.323 |
| 6,042,193 | A | * | 3/2000 | Bonning et al. | 301/63.105 |

(Continued)

FOREIGN PATENT DOCUMENTS

JP          47-6570         3/1972

(Continued)

*Primary Examiner*—Russell D. Stormer
(74) *Attorney, Agent, or Firm*—Hamre, Schumann, Mueller & Larson, P.C.

(57) ABSTRACT

A vehicle wheel comprises a rim (172) and a disk section (171) separate from the rim. Since the disk section is separate from the rim, the freedom of designing the disk section is improved. The rim comprises an outer rim (178) and an inner rim (181) separate from the outer rim. The outer and inner rims are attached to the outer periphery of the disk section at the same place by welding.

5 Claims, 12 Drawing Sheets

U.S. PATENT DOCUMENTS

| | | | |
|---|---|---|---|
| 6,106,077 A * | 8/2000 | Kluge et al. | 301/35.623 |
| 6,315,366 B1 | 11/2001 | Post et al. | |
| 6,644,756 B1 * | 11/2003 | Handa et al. | 301/95.101 |

FOREIGN PATENT DOCUMENTS

| | | |
|---|---|---|
| JP | 53-39232 | 11/1978 |
| JP | 54-3703 | 12/1979 |
| JP | 58-122198 | 7/1983 |
| JP | 62-71003 | 6/1987 |
| JP | 1-168501 | 7/1989 |
| JP | 3-55441 | 10/1991 |
| JP | 5-278402 | 10/1993 |
| JP | 9-20103 | 1/1997 |
| JP | 2001-269739 | 10/2001 |

* cited by examiner

VEHICLE WHEEL

TECHNICAL FIELD

The present invention relates to vehicle wheels which allow for increased productivity and impart increased design freedom to disks of such wheels. The invention also relates to wheels for unleveled-terrain vehicles, which have improved centering accuracy and can be manufactured with a minimum cost.

BACKGROUND ART

Known vehicle wheels include) a two-piece wheel with a rim attached to a side surface of a disk (Japanese Utility Model Laid-Open Publication No. SHO-62-71003), a wheel with a half-split rim (Japanese Patent Laid-Open Publication No. HEI-9-20103), a two-piece wheel with a disk attached to the inside of a rim (Japanese Utility Model Laid-Open Publication No. HEI-3-55441), and a wheel of a three-piece configuration.

Figure 10:
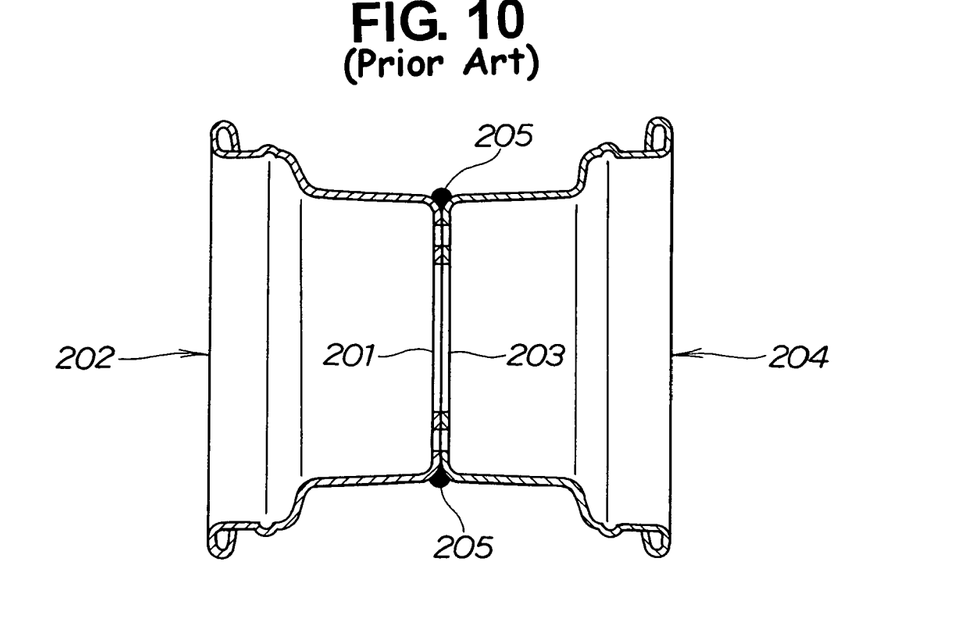
FIG. 10 is a cross-sectional view of a wheel according to a first conventional art.

FIG. 10 hereof illustrates a wheel disclosed in Japanese Utility Model Publication No. SHO-62-71003. This wheel has a configuration in which a rim half 202 provided with a disk 201 and a rim half 204 provided with a disk 203 are welded together at the peripheries of the disk 201 and the disk 203. 205 denotes welds.

Figure 11:
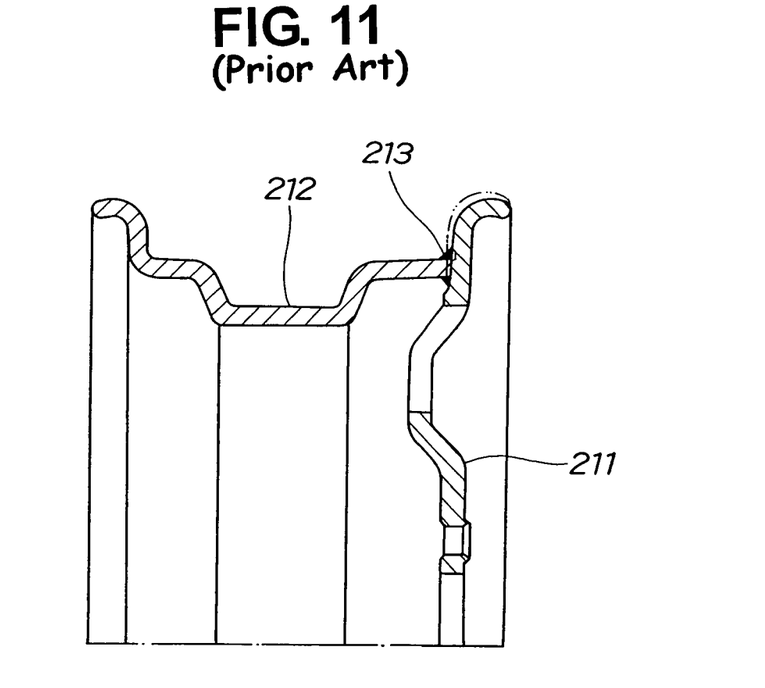
FIG. 11 is a cross-sectional view of a wheel according to a second conventional art.

FIG. 11 hereof illustrates a wheel disclosed in Japanese Patent Laid-Open Publication No. HEI-9-20103. This wheel is configured with a rim 212 welded to a side surface of a disk 211. 213 denotes a weld.

Figure 12:
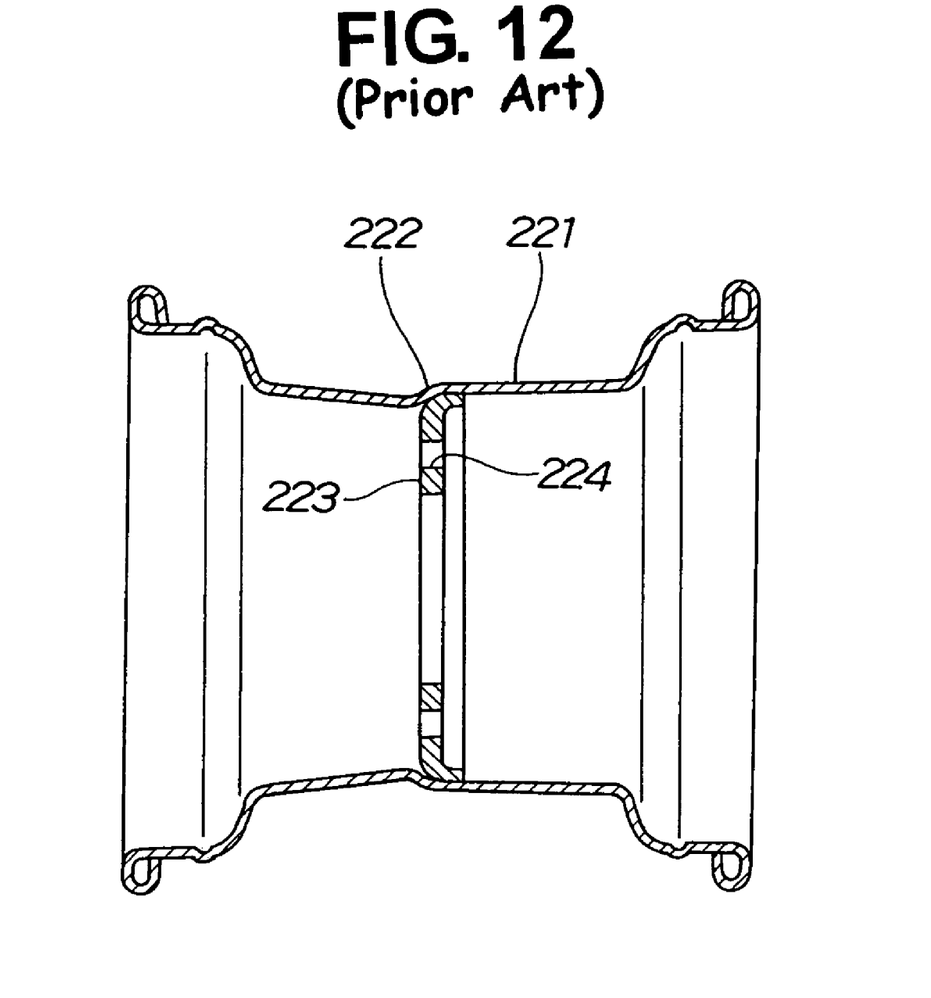
FIG. 12 is a cross-sectional view of a wheel according to a third conventional art.

FIG. 12 hereof illustrates a wheel disclosed in Japanese Utility Model Laid-Open Publication No. HEI-3-55441. This wheel is a small-diameter large-width wheel having a step 222 provided in a well 221 of a rim, a disk 223 attached to the step 222, and a plurality of mounting holes 224 provided in the disk 223 for mounting to a hub of a vehicle.

Figure 13:
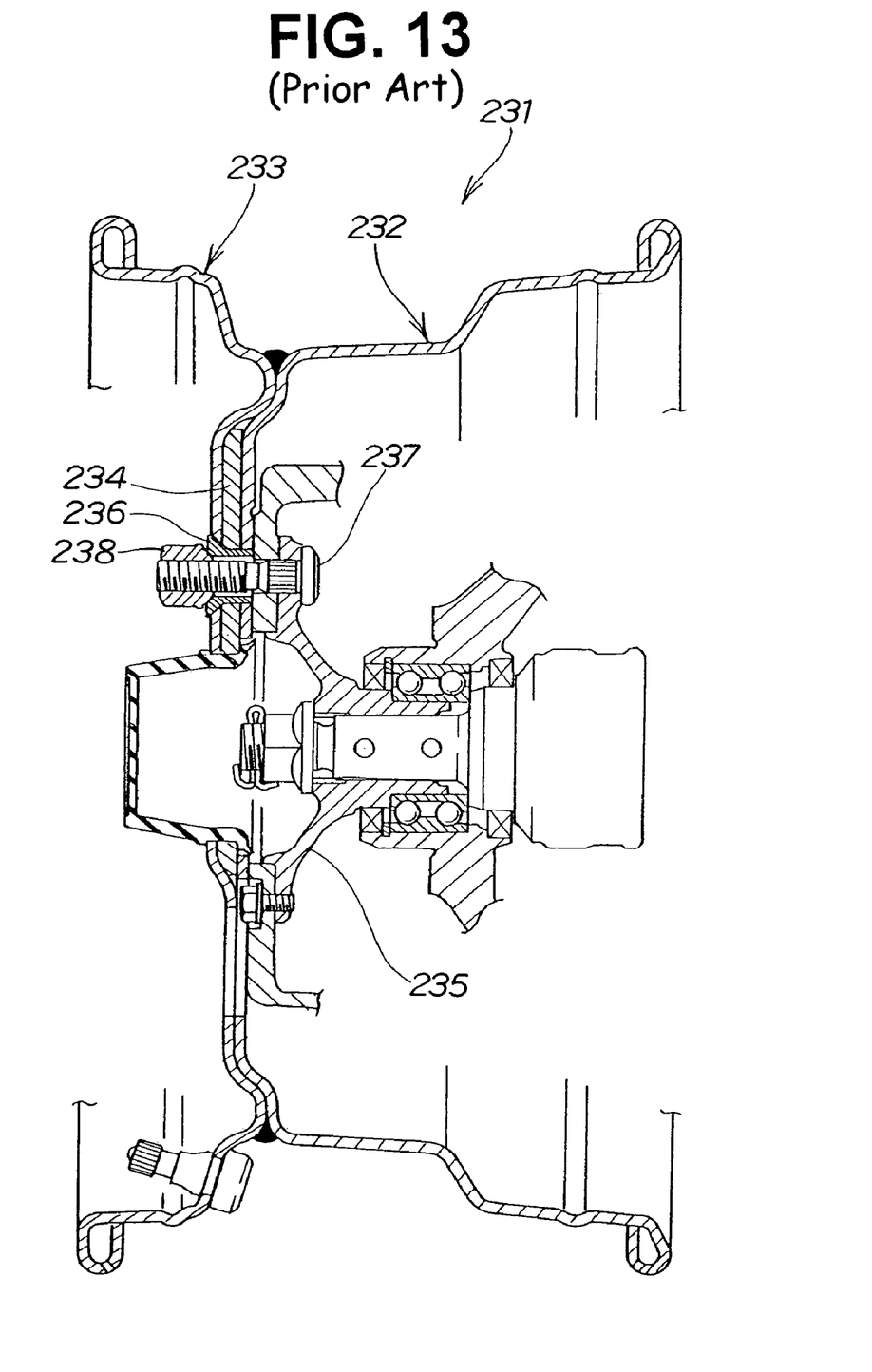
FIG. 13 is a cross-sectional view of a wheel according to a fourth conventional art.

FIG. 13 hereof illustrates a wheel of a three-piece configuration. A wheel 231 consists of an inner wheel 232, an outer wheel 233, a center disk 234 interposed between the inner wheel 232 and the outer wheel 233, and a plurality of connecting members 236 for connecting those three components together and also serving as mounting parts to a hub 235. The connecting members 236 are provided with nut seats for receiving nuts 238 screwed to bolts 237 at the side of the hub 235. With the connecting members 236, the wheel 231 is centered with respect to the hub 235.

In the wheel shown in FIG. 10, the disks 201, 203 of the rim halves 202, 204 are planar. In the case of providing depressions and protrusions or decorative holes in the disks 201, 203, the disks 201, 203 should be formed to an exact shape; otherwise it becomes difficult to join the disks 201, 203 together. Accordingly, the shape of the disks 201, 203 has to be made simple. Under this, the design freedom of the disks 201, 203 is reduced.

The disk 211 shown in FIG. 11 is produced by press molding and the rim 212 is formed by roll forming. If the disk 211 and the rim 212 could be formed by the same forming method such as press molding, they could be produced by the same processing machine on the same line, resulting in improved productivity.

For the wheel shown in FIG. 12, to mount the wheel to the hub, the accuracy of the mounting holes 224 to be fitted to bolts at the hub should be improved; otherwise it becomes difficult to improve the centering accuracy of the wheel with respect to the hub. Improving the accuracy of the mounting holes 224 results in cost increase.

The wheel shown in FIG. 13 has the connecting members 236 as additional members to the other members of the wheel 231, thus having an increased number of components, and the wheel 231 has the three-piece configuration, thus resulting in an increased number of assembling steps, which leads to cost increase.

DISCLOSURE OF THE INVENTION

It is an object of the present invention to provide improvements in wheels so that they can be manufactured with increased productivity, impart increased design freedom to disk members, have increased centering accuracy, and can be manufactured with a reduced cost.

According to the present invention, there is provided a vehicle wheel which comprises: a disk mountable to a hub of a vehicle; a circular outer rim formed separately from the disk, located outward of the vehicle than the disk and secured to an outer periphery of the disk; and a circular inner rim formed separately from the outer rim and the disk, located inward of the vehicle than the disk and secured to the outer periphery of the disk; the outer rim and the inner rim being secured to the periphery of the disk at a same joint.

In the present invention, since the rim comprises the outer rim and the inner rim, the outer rim and the inner rim can be press-molded in this invention as compared with conventional roll forming of rims of integral configurations. Further, since the disk is also press-molded, productivity and quality of wheels can be improved. In addition, since the disk is formed separately from the outer rim and the inner rim, the design freedom of the disk including degrees of freedom of design, dimensions such as plate thickness, mechanical strength and the like can be improved.

Advantages of this invention of allowing the outer rim and the inner rim to be press-molded include the facts that: the plate thickness can be stabilized by deep drawing; dimensional accuracy can be improved; work hardening can be effectively performed by deep drawing; the need for sanding welds can be eliminated because there are no weld lines as caused by roll forming, resulting in a good appearance; and difference in surface condition due to structural difference between welded portions and unwelded portions is not caused even under alumite processing.

In the present invention, the disk preferably has a bend formed by bending a peripheral portion of the disk, to which bend the outer rim and the inner rim are secured. Thus fitting the outer rim and the inner rim to the bend of the disk and welding the outer rim and the inner rim together to the disk allow the outer rim and the inner rim to be stably temporarily secured to the disk, resulting in stable welding and enhanced wheel quality.

In the present invention, the disk preferably comprises a single flat plate having a plurality of bolt insertion holes into which bolts are inserted to make the disk mountable to the hub, and spherical seats formed at peripheral portions of the bolt insertion holes to be seated by nuts screwed to the bolts.

The formation of the spherical seats in this manner facilitates the formation of its work-hardened layers and can reduce friction at the spherical seats for wheels which require great fastening strength of nuts such as large-width wheels with large ratios of the widths to the outside diameters to be mounted to vehicles for traveling on an unleveled terrain.

Since the disk is a flat plate, the processing accuracy of the spherical seats can be further improved. The wheel can be mounted to the hub of the vehicle with the concentricity between the rotation center of the hub and the center of the wheel configuration, that is, the centering accuracy of the wheel further improved. The workability of the spherical seats to the disk is also improved.

The disk of a flat plate can simplify the shape of a press molding tool for the disk. Further, the disk is a single plate, thus being able to simplify the configuration of the wheel and reduce wheel production costs including processing costs and material costs.

BEST MODE FOR CARRYING OUT THE INVENTION

Figure 1:
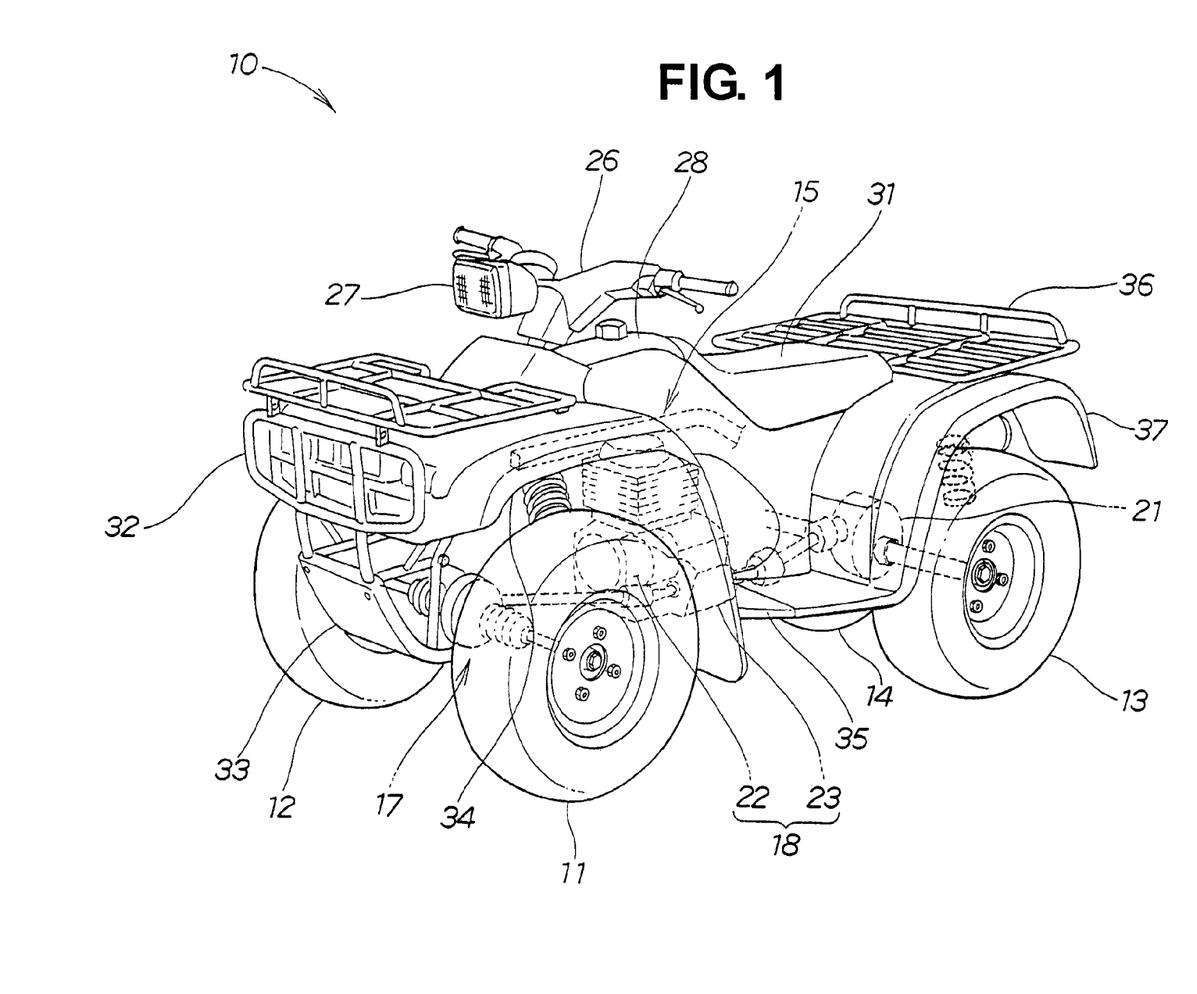
FIG. 1 is a perspective view of a vehicle employing wheels according to the present invention.

FIG. 1 illustrates an example of a vehicle employing wheels according to the present invention. The vehicle 10 is for traveling on unleveled grounds, having left and right front wheels 11, 12 and left and right rear wheels 13, 14 supported by suspension arms not shown mounted to a vehicle frame 15 in a vertically movable manner, the front wheels 11, 12 being connected to a power unit 18 located near the center of the vehicle body via a front reduction gear 17, and the rear wheels 13, 14 being connected to the power unit 18 via a rear reduction gear 21. The power unit 18 consists of an engine 22 and a transmission 23 connected to an output shaft of the engine 22.

Reference numeral 26 denotes handlebars for steering the front wheels 11, 12, 27 a headlight, 28 a fuel tank, 31 a seat, 32 a front guard for protecting the vehicle front, 33 a front undercover for protecting the suspension at the front and the power train, 34, 34 (reference numeral 34 at the back is not shown) front fenders covering upper and rear portions of the front wheels 11, 12, 35, 35 (reference numeral 35 at the back is not shown) steps on which a driver put his foot, 36 a rear carrier on which to put a load, 37, 37 (reference numeral 37 at the back is not shown) rear fenders covering front and upper portions of the rear wheels 13, 14.

Figure 2:
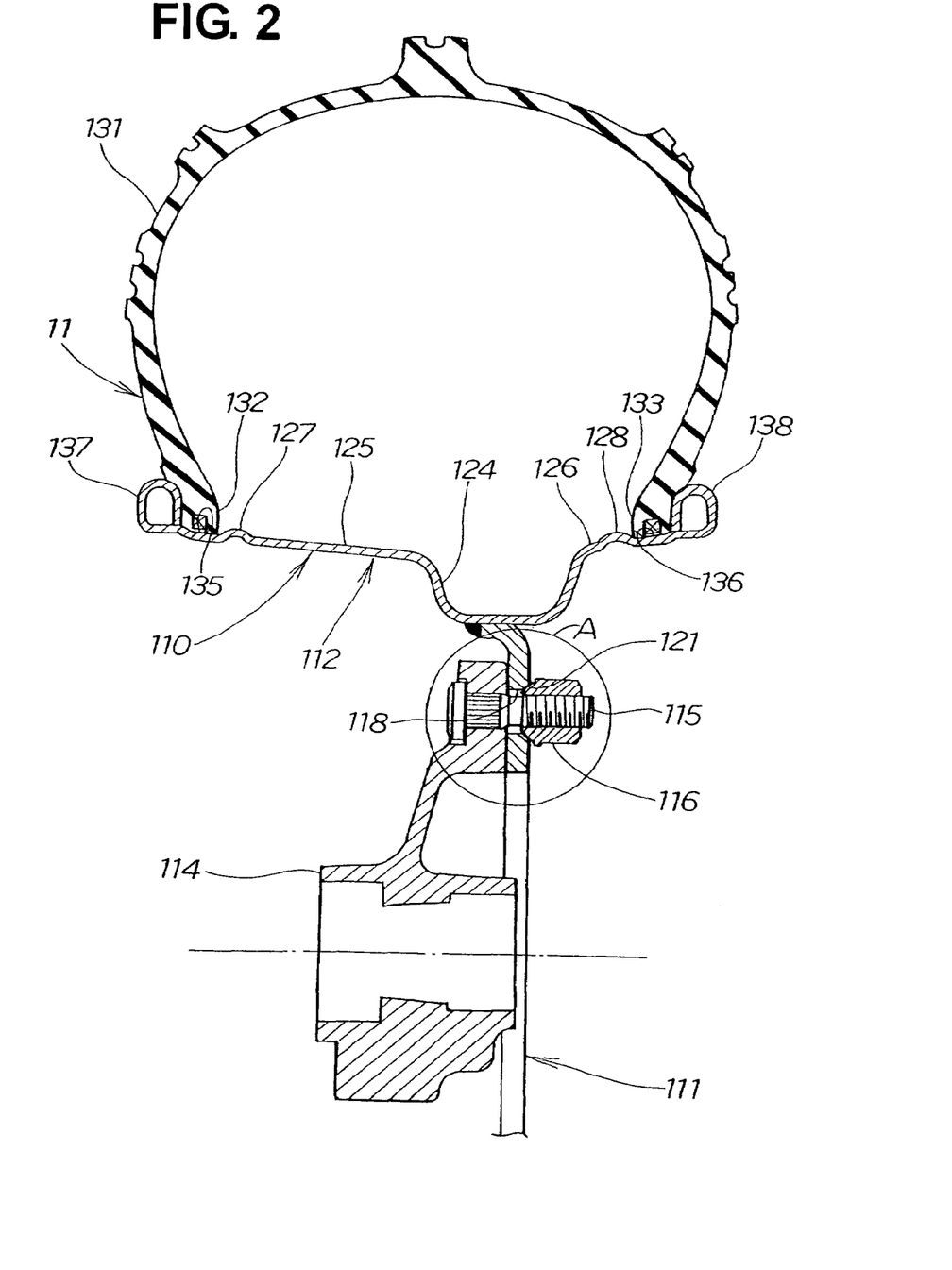
FIG. 2 is a cross-sectional view of a wheel according to a first embodiment of the present invention.
Figure 3:
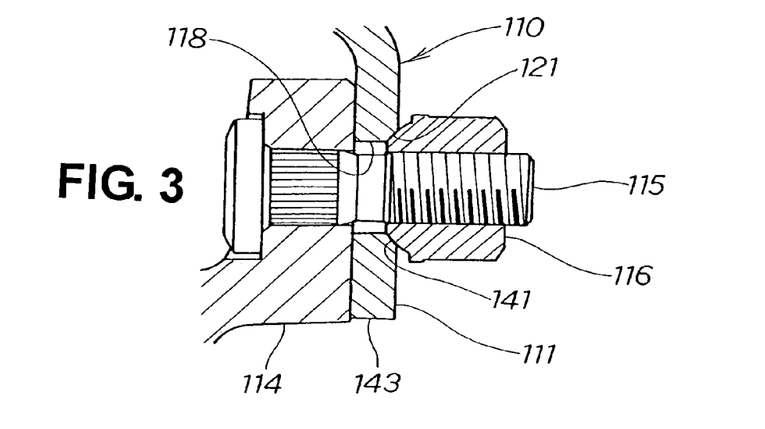
FIG. 3 is an enlarged view of portion A in FIG. 2.
Figure 4:
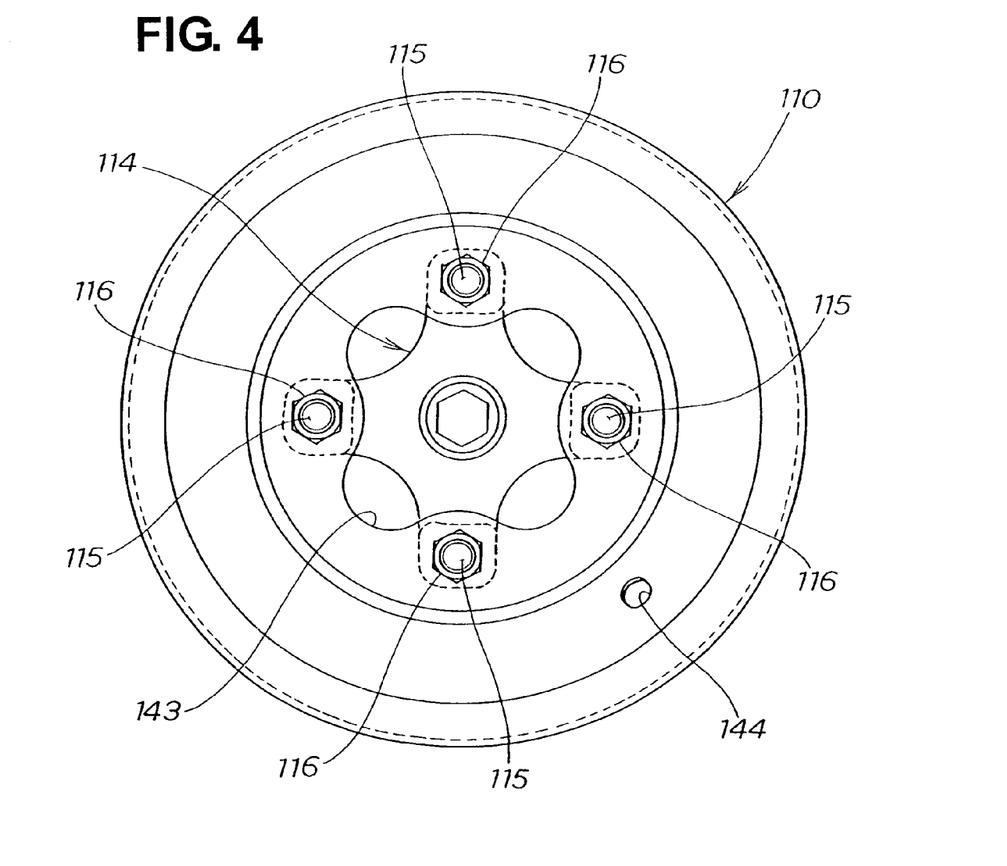
FIG. 4 is an elevation view of the wheel shown in FIG. 2.

FIGS. 2 to 4 illustrate a vehicle wheel according to a first embodiment of the present invention.

Referring to FIG. 2, a wheel 110 made from an aluminum alloy as a component of the front wheels 11, 12 (for the front wheel 12, see FIG. 1) includes a disk 111 and a rim 112 attached to the periphery of the disk 111. 114 denotes a hub connected to the front reduction gear 17 (see FIG. 1) via a drive shaft not shown, 115 one of a plurality of bolts fitted into the hub 114, 116 a wheel nut screwed to the bolt 115 for mounting the wheel 110 to the hub 114.

The disk 111 is a single flat plate. A plurality of bolt insertion holes 118 (only one of them is shown) for inserting the bolts 115 are formed in the disk 111. A spherical seat 121 to be seated by the wheel nut 116 is formed around the bolt insertion hole 118.

The rim 112 consists of a rim well 124 formed in a channel-like shape near the center, tapers 125, 126 provided at the opposite sides of the rim well 124, humps 127, 128 formed upward at edges of the tapers 125, 126, bead seats 135, 136 formed outward of the humps 127, 128 for retaining the inner peripheries of beads 132, 133 of a tire 131 constituting the front wheel 11, and curls 137, 138 formed by curling the edges of the bead seats 135, 136 for retaining outside surfaces of the beads 132, 133 of the tire 131.

The rim well 124 is a portion into which the beads 132, 133 of the tire 131 are dropped when the tire 131 is mounted or demounted.

The humps 127, 128 are circular projections for preventing the tire 131 from being removed from the bead seats 135, 136.

The above-described wheel 110 is also employed for the rear wheels 13, 14 (see FIG. 1).

FIG. 3 is an enlarged view of portion A in FIG. 2, illustrating that the spherical seat 121 with a concave spherical surface is formed at a peripheral portion of the bolt insertion hole 118 in the wheel 110 and a convex spherical portion 141 provided at the wheel nut 116 is seated against the spherical seat 121.

The spherical seat 121 allows exact positioning or centering of the wheel 110 with respect to the hub 114.

FIG. 4 illustrates an elevation view of the wheel shown in FIG. 2. The bolts 115 are mounted to end portions of the hub 114 in a cross shape. The bolts 115 are fitted into the bolt insertion holes 118 in the wheel 110 (see FIG. 3), and the wheel nuts 116 are screwed to the bolts 115, whereby the wheel 110 is secured to the hub 114. 143 denotes an opening at the center of the wheel 110, and 144 a valve mounting hole for the tire 131 (see FIG. 2).

Figure 5A:
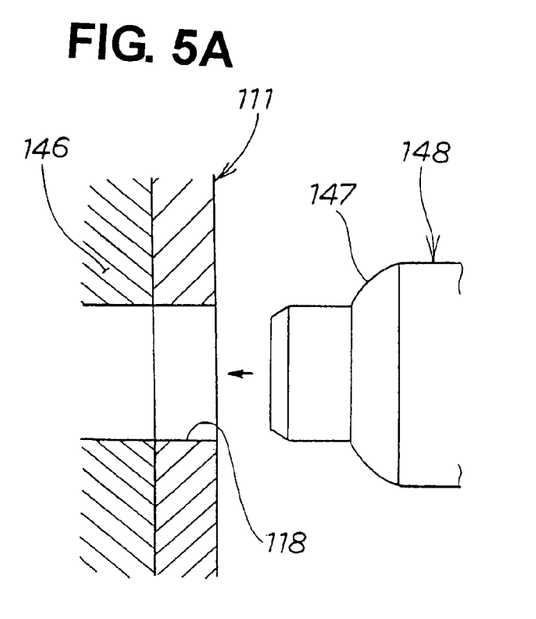
FIGS. 5A to 5C are diagrams illustrating a method of forming a spherical seat on the wheel shown in FIG. 3.
Figure 5B:
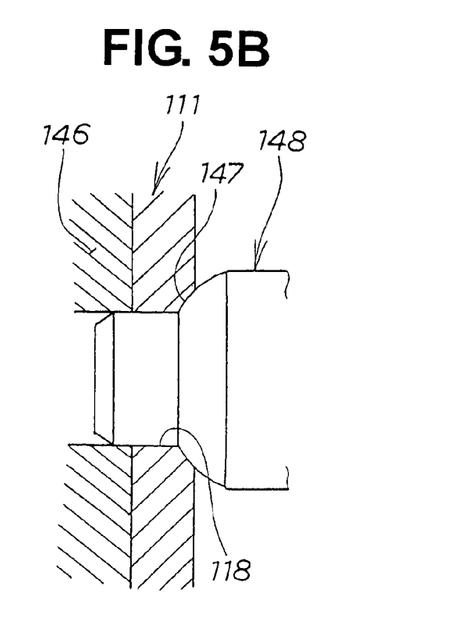
Figure 5C:
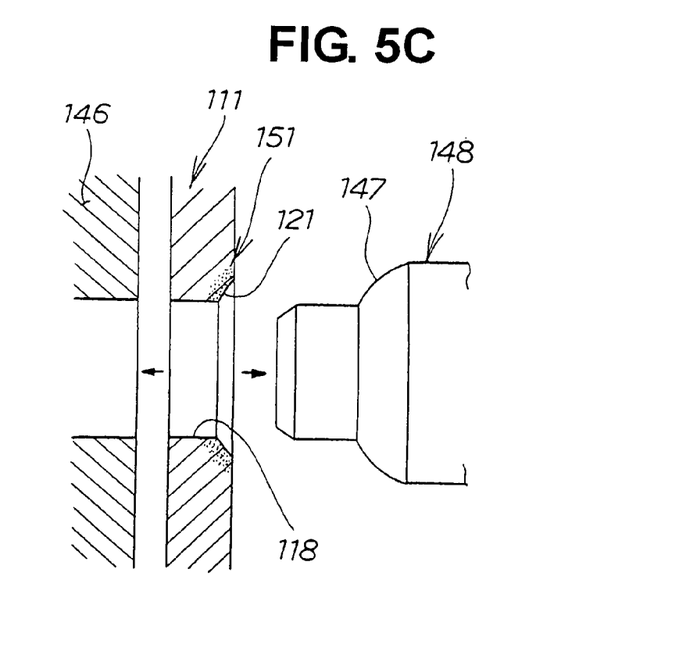

FIGS. 5A to 5C illustrate a method of forming spherical seats in a wheel according to the first embodiment.

As shown in FIG. 5A, the bolt insertion hole 118 is formed in the disk 111 using a die 146, and then a punch 148 having a spherical surface 147 is moved. The punch 148 is pressed against an edge portion of the bolt insertion hole 118 as shown in FIG. 5B, forming the seat 121 in a spherical shape at the edge portion of the bolt insertion hole 118. Thereafter, as shown in FIG. 5C, the die 146 and the punch 148 are removed from the disk 111.

With this, the spherical seat 121 having a work-hardened layer 151 is formed at the edge portion of the bolt insertion hole 118.

Figure 6:
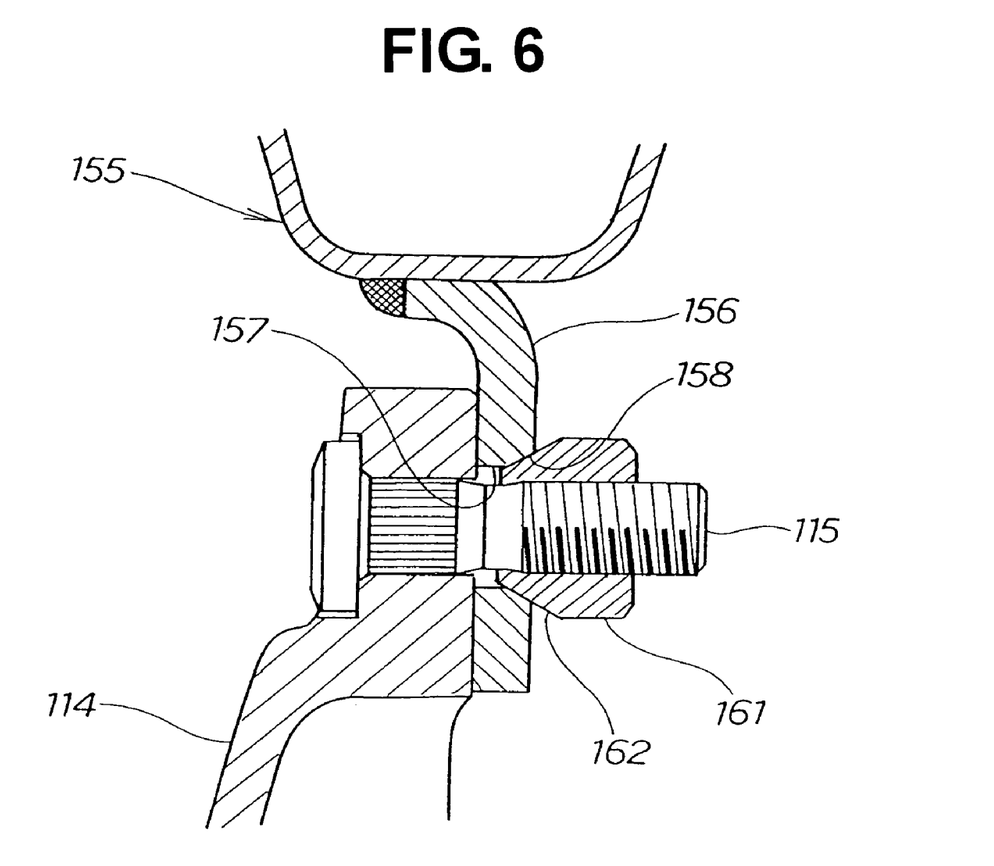
FIG. 6 is a cross-sectional view of a wheel according to a second embodiment of the present invention, exemplarily illustrating a seat formed as a taper seat in a bolt insertion hole formed in a disk.

FIG. 6 illustrates a wheel according to a second embodiment of the present invention. A disk 156 of the wheel 155 is formed with a plurality of bolt insertion holes 157, and taper seats 158 in a tapered shape are formed at peripheral portions of the bolt insertion holes 157, against which taper seats 158 tapers 162 formed at wheel nuts 161 are seated.

The same components as shown in FIGS. 2 and 3 are given the same reference numerals and will not be described.

The formation of the taper seats 158 as described above allows reduction in processing cost because the formation is easy. The taper seats 158 allow improved centering accuracy in mounting the wheel 155 to the vehicle body.

Figure 7:
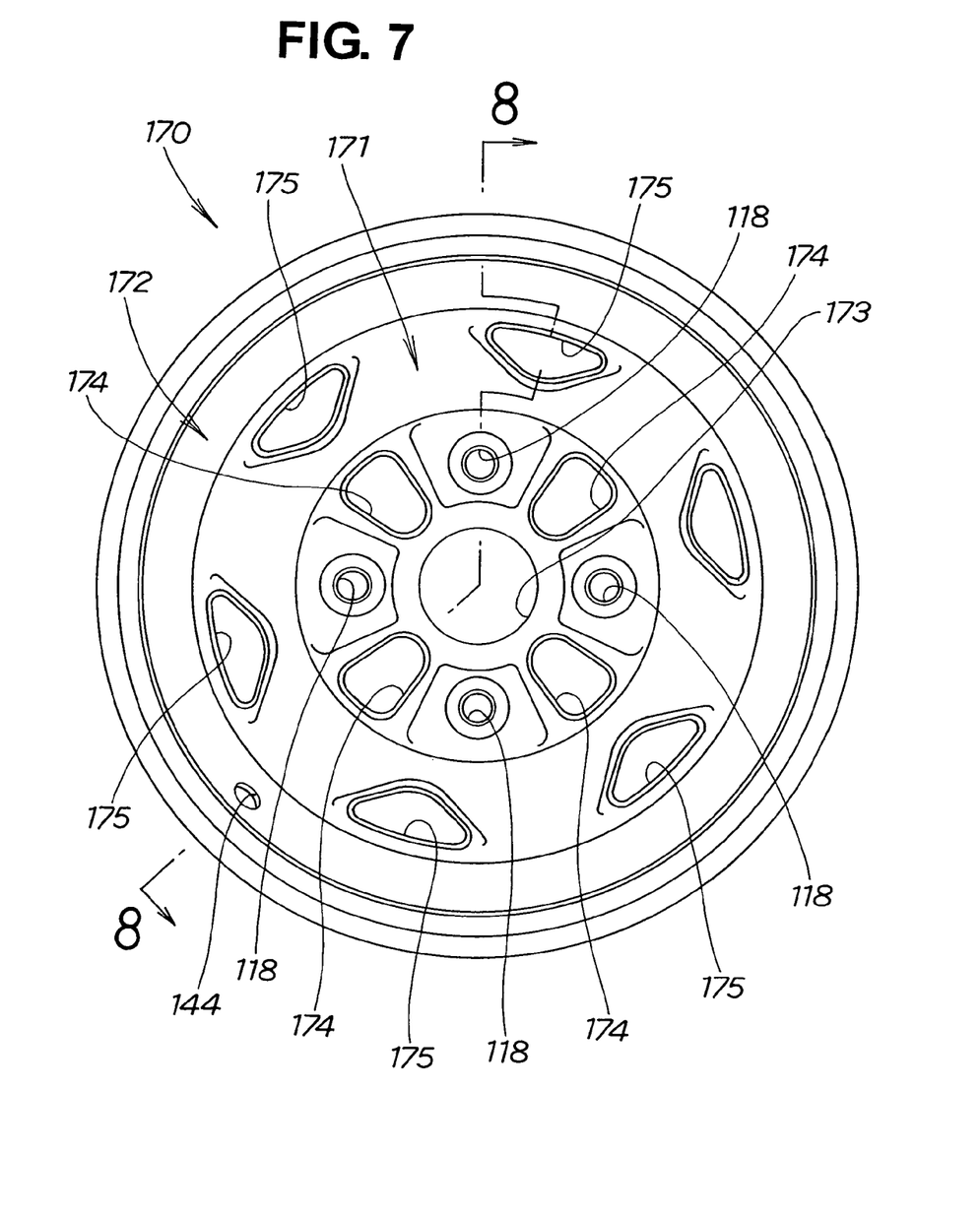
FIG. 7 is an elevation view of a wheel according to a third embodiment of the present invention.
Figure 8:
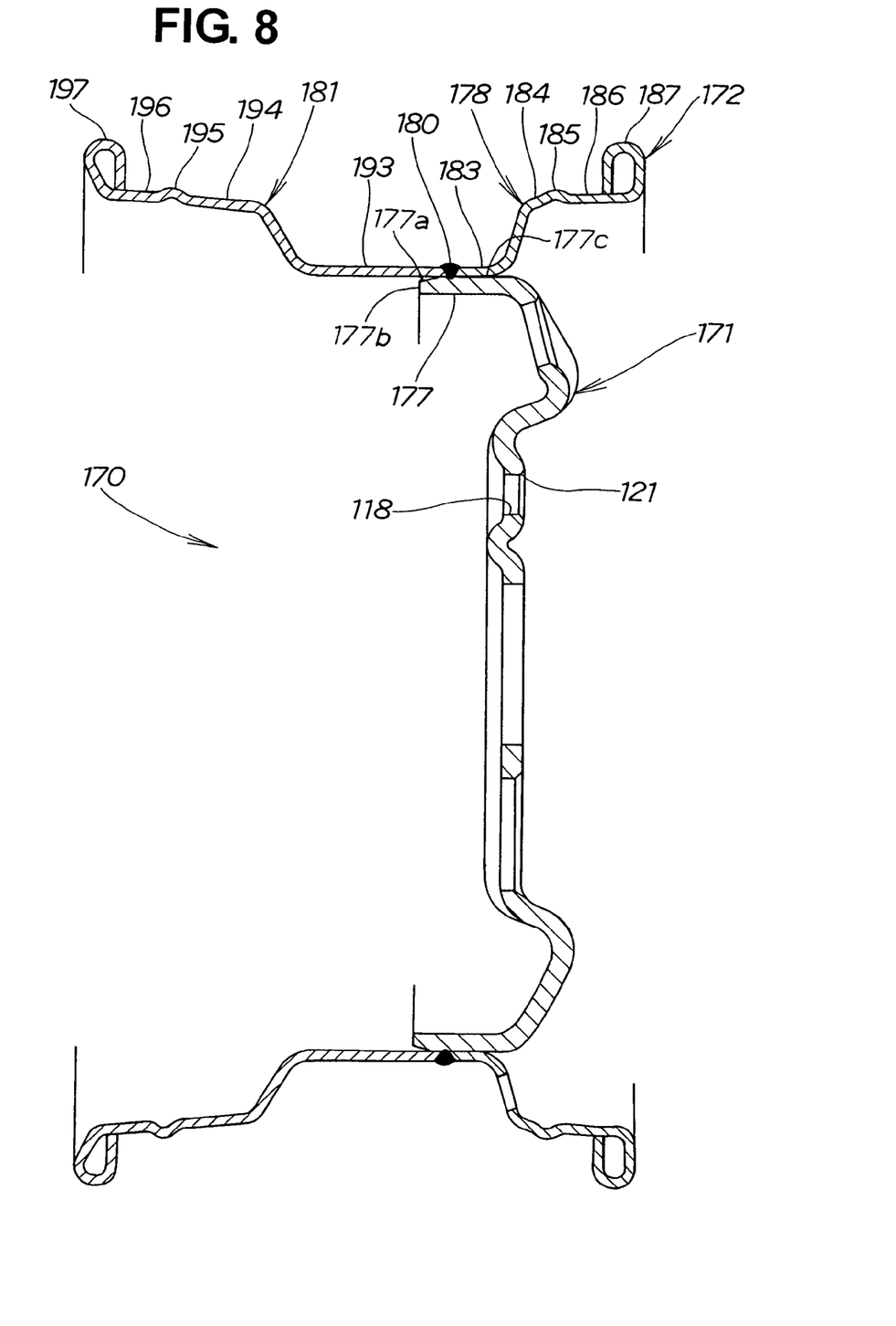
FIG. 8 is a cross-sectional view taken along line 8-8 in FIG. 7.

FIGS. 7 and 8 illustrate a wheel according to a third embodiment of the present invention. The same components as in the embodiment shown in FIGS. 1 to 5 are given the same reference numerals and will not be described.

As shown in FIG. 7, a wheel 170 made from an aluminum alloy of the third embodiment includes a disk 171 and a rim 172 attached to the periphery of the disk 171.

The disk 171 is a member press-molded from a single plate material, having a plurality of bolt insertion holes 118 for mounting to a hub shown in FIG. 2 with a plurality of bolts 115 and a plurality of wheel nuts 116, a center hole 173 formed in the center, and a plurality of decorative holes 174, 175 for decoration. The rim 172 has a valve mounting hole 144.

As shown in FIG. 8, the disk 171 has spherical seats 121 to be seated by the wheel nuts 116 (see FIG. 2) formed around the bolt insertion hole 118 and a tubular bend 177 formed by bending its peripheral portion.

177a denotes an edge of the bend 177, more specifically, a chamfer provided by cutting off a corner between an end face 177b and a peripheral surface 177c of the bend 177, which is provided for preventing stress concentration caused by the corner abutting against the rim 172.

The rim 172 is a member half-split into an outer rim 178 and an inner rim 181 provided inward of the outer rim 178.

180 denotes a weld at which an edge of the outer rim 178 and an edge of the inner rim 181 are welded to the disk 171.

The outer rim 178 is a member formed by press molding, consisting of a rim well portion 183 provided at an edge portion, a taper 184 adjacent to the rim well portion 183, a hump 185 formed upward at an edge of the taper 184, a bead seat 186 formed outward of the hump 185 for retaining the inner periphery of a bead 133 (see FIG. 2) of a tire 131 (see FIG. 2), and a curl 187 formed by curling the edge of the bead seat 186 for retaining an outside surface of the bead 133 of the tire 131.

The inner rim 181 is a member formed by press molding, consisting of a rim well portion 193 provided at an edge portion, a taper 194 adjacent to the rim well portion 193, a hump 195 formed upward at an edge of the taper 194, a bead seat 196 formed outward of the hump 195 for retaining the inner periphery of a bead 132 (see FIG. 2) of the tire 131 (see FIG. 2), and a curl 197 formed by curling the edge of the bead seat 196 for retaining an outside surface of the bead 132 of the tire 131.

Into the rim well portions 183, 193, the beads 132, 133 of the tire 131 are dropped when the tire 131 shown in FIG. 2 is mounted or demounted.

The humps 185, 195 are circular projections for preventing the tire 131 from being removed from the bead seats 186, 196.

The assembling procedure of the above-described wheel 170 will be described with reference to FIGS. 9A to 9D.

Figure 9A:
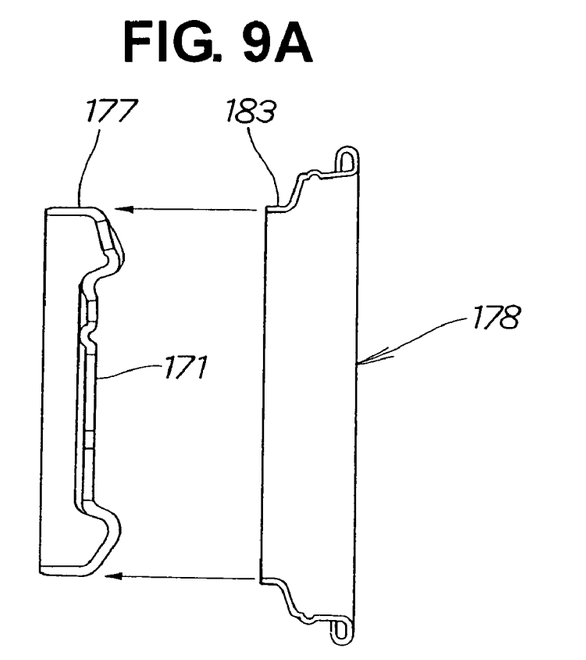
FIGS. 9A to 9D are diagrams illustrating a method of assembling a wheel according to the present invention.

In FIG. 9A, the rim well portion 183 of the press-molded outer rim 178 is pressed onto the bend 177 of the press-molded disk 171 to a predetermined position.

Figure 9B:
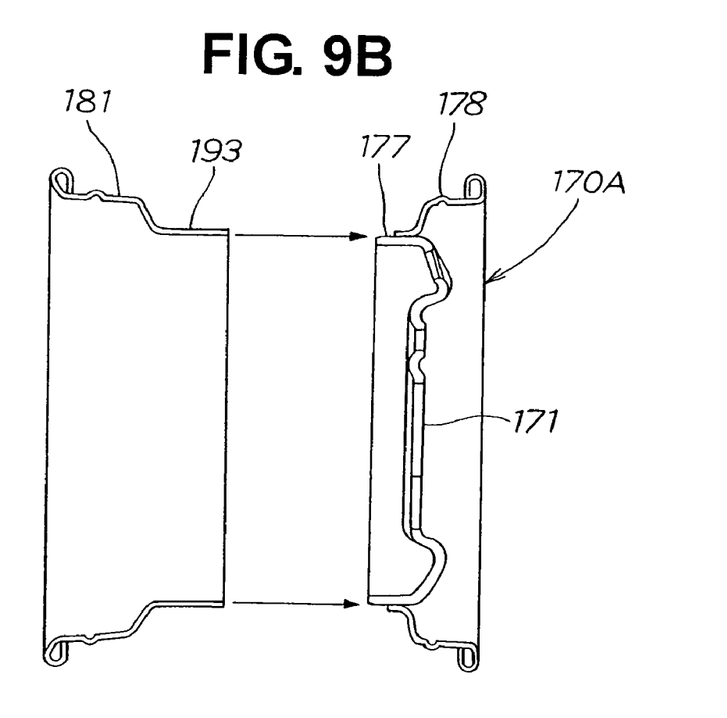

In FIG. 9B, the rim well portion 193 of the inner rim 181 is pressed onto the bend 177 of an assembly 170A formed in FIG. 9A to a predetermined position.

Figure 9C:
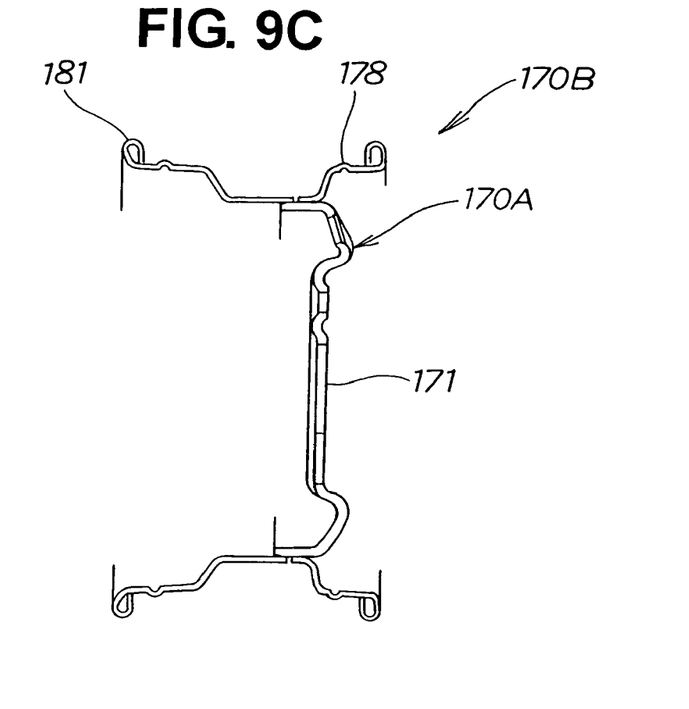

FIG. 9C illustrates an assembly 170B formed by press-fitting the inner rim 181 to the assembly 170A.

Figure 9D:
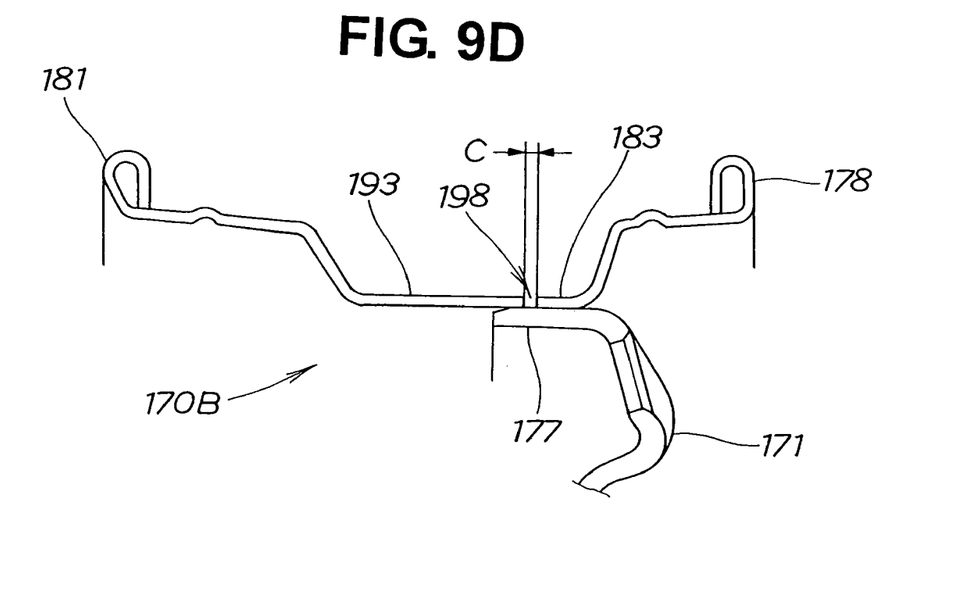

FIG. 9D is an enlarged view of a press-fitted portion of the outer rim 178 and the inner rim 181 to the disk 171, illustrating that a gap 198 of clearance C is provided between the outer rim 178 and the inner rim 181 by, for example, a jig.

Then, the edge of the outer rim 178 and the edge of the inner rim 181 are welded to the bend 177 via the gap 198 to obtain the wheel 170 shown in FIG. 8.

According to this invention, the disk 171 is formed separately from the rim 172 as shown in FIG. 8, so that the disk 171 can be made thicker than the rim 172. When the outer rim 178 and the inner rim 181 are welded to the disk 171, no influence of the welding is left on the inner peripheral surface of the bend 177. Specifically, so-called "back bead formation" caused when the plate thickness of a disk is small, such as the coloring or the surface-swelling of the inner peripheral surface of a bend due to structural changes under high temperature during welding, is prevented. The back bead formation undesirably impairs the appearance and causes surface irregularity in alumite processing.

As described above, for a vehicle for traveling on unleveled grounds, especially for a buggy, the large-width wheels 110 are mounted, so that great loads act on the disks 111. It is thus required to increase the plate thickness of the disks 111 for improving the rigidity of the disks 111. For this reason, forming the disks 111 in a flat plate can further improve workability thereof.

Forming the spherical seat 121 as a seat for the wheel nut 116 can increase the contact area of the wheel 110 and the wheel nut 116 and prevent the deformation of the disk 111 even when the wheel nut 116 is screwed by a great force to increase fastening strength. That is, the wheel 110 can be secured by a great fastening force without the deformation of the disk 111.

FIGS. 9A to 9C illustrate an example of press-fitting the outer rim 178 and the inner rim 181 to the disk 171, but the present invention is not limited thereto. It is also possible to temporarily secure the outer rim 178 and the inner rim 181 to the disk 171 by shrinkage fit, cooling fit or screwing.

In FIG. 9D, arts of providing a gap 198 between the outer rim 178 and the inner rim 181 may include providing a step or a male screw at the bend 177 of the disk 171, and raising a pin on the bend 177.

INDUSTRIAL APPLICABILITY

According to the wheel configuration of the present invention, a rim is formed separately from a disk and comprises an outer rim located vehicle outward of the disk and an inner rim formed separately from the outer rim and located vehicle inward of the outer rim, which outer rim and inner rim are secured to the periphery of the disk at the same joint. As compared with conventional roll forming of a rim of an integral configuration, the outer rim and the inner rim can be press-molded. The disk is also press-molded, thus improving the wheel productivity and quality. Further, since the disk is a separate element, the design freedom of disks can be improved, which is advantageous in the vehicle wheel manufacturing field.

The invention claimed is:
1. A vehicle wheel comprising:
a disk mountable to a hub of a vehicle, the disk having a bend formed at a peripheral portion thereof, and a chamfer provided at a corner between an end face and a peripheral surface of the bend;

a circular outer rim formed separately from the disk, located outward relative to the vehicle and pressed onto the bend of the disk;

a circular inner rim formed separately from the outer rim and the disk, located inward relative to the vehicle from the disk and pressed onto the bend of the disk, a gap is defined between the outer rim and the inner rim, and the outer and inner rims are weld connected to the bend at the gap.

2. A wheel as set forth in claim 1, wherein the disk comprises a single flat plate having a plurality of bolt insertion holes into which bolts are inserted to make the disk mountable to the hub, and spherical seats formed at peripheral portions of the bolt insertion holes to be seated by nuts screwed to the bolts.

3. A wheel as set forth in claim 1, wherein the chamfer creates a gap between the end face of the bend and an interior surface of the inner rim.

4. A wheel as set forth in claim 1, wherein the disk has a thickness greater than a thickness of the outer rim and a thickness of the inner rim.

5. A wheel as set forth in claim 2, further comprising a plurality of decorative holes formed in the disk.

\* \* \* \* \*